(12) United States Patent
Yang et al.

(10) Patent No.: US 11,451,996 B2
(45) Date of Patent: Sep. 20, 2022

(54) METHODS AND APPARATUSES FOR PLMN RATE CONTROL

(71) Applicant: Telefonaktiebolaget LM Ericsson (publ), Stockholm (SE)

(72) Inventors: Shiyu Yang, Shanghai (CN); Zhiwei Qu, Shanghai (CN); Kaj Johansson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/437,299

(22) PCT Filed: Mar. 10, 2020

(86) PCT No.: PCT/CN2020/078569
§ 371 (c)(1),
(2) Date: Sep. 8, 2021

(87) PCT Pub. No.: WO2020/182119
PCT Pub. Date: Sep. 17, 2020

(65) Prior Publication Data
US 2022/0095148 A1 Mar. 24, 2022

(30) Foreign Application Priority Data

Mar. 11, 2019 (WO) ............... PCT/CN2019/077651
Apr. 12, 2019 (WO) ............... PCT/CN2019/082512

(51) Int. Cl.
*H04W 28/02* (2009.01)
*H04W 8/08* (2009.01)
*H04W 84/04* (2009.01)

(52) U.S. Cl.
CPC ............ *H04W 28/02* (2013.01); *H04W 8/08* (2013.01); *H04W 84/042* (2013.01)

(58) Field of Classification Search
CPC ..... H04W 28/02; H04W 8/08; H04W 84/042; H04W 28/22; H04W 28/26; H04W 28/16;
(Continued)

(56) References Cited

U.S. PATENT DOCUMENTS

2005/0039103 A1\* 2/2005 Azenko et al. ............... 714/776
2008/0207216 A1\* 8/2008 Usuda et al. .................. 455/453
(Continued)

FOREIGN PATENT DOCUMENTS

| CN | 103313328 A | 9/2013 | |
| CN | 110859012 A * | 3/2020 | ............ H04W 28/22 |
| WO | WO 2018103512 A1 * | 6/2018 | ............ H04W 28/08 |

OTHER PUBLICATIONS

International Search Report and Written Opinion issued in International Application No. PCT/CN2020/078569 dated Jun. 5, 2020 (7 pages).

(Continued)

*Primary Examiner* — Meless N Zewdu
(74) *Attorney, Agent, or Firm* — Rothwell, Figg, Ernst & Manbeck, P.C.

(57) ABSTRACT

Methods and apparatuses are disclosed for public land mobile network (PLMN) rate control. According to an embodiment, a network function determines whether a value of PLMN rate control applicable to a terminal device has been changed. When determining that the value of PLMN rate control has been changed, the network function sends the changed value of PLMN rate control to the terminal device.

9 Claims, 4 Drawing Sheets

Determine whether a value of PLMN rate control applicable to a terminal device has been changed ⎬ 202

When determining that the value of PLMN rate control has been changed, send the changed value of PLMN rate control to the terminal device ⎬ 204

(58) Field of Classification Search
CPC ............ H04W 36/08; H04W 28/0252; H04W 28/0257; H04W 28/0263; H04W 28/0268; H04W 28/08; H04W 28/06; H04W 28/00; H04W 88/00; H04W 88/02; H04W 88/08; H04W 36/12; H04W 36/26; H04W 36/30; H04W 8/18; H04W 8/20; H04W 4/02; H04W 28/24; H04W 28/18; H04W 28/20; H04W 36/00; H04W 36/14; H04W 36/38; H04W 36/34; H04W 36/36; H04W 88/16; H04W 88/18; H04W 88/181; H04W 92/06; H04W 92/00; H04W 64/00; H04W 60/00; H04W 60/005; H04W 8/082
See application file for complete search history.

(56) References Cited

U.S. PATENT DOCUMENTS

| | | | | |
|---|---|---|---|---|
| 2010/0266080 | A1* | 10/2010 | Akita et al. | 375/362 |
| 2010/0329176 | A1* | 12/2010 | Agarwal et al. | 370/316 |
| 2015/0072686 | A1 | 3/2015 | Xu et al. | |
| 2017/0048151 | A1* | 2/2017 | Jung et al. | H04L 47/193 |
| 2017/0048746 | A1* | 2/2017 | Ronneke | H04W 28/0289 |
| 2018/0070219 | A1* | 3/2018 | Khoryaev et al. | H04W 8/005 |
| 2019/0007329 | A1* | 1/2019 | Velev et al. | H04L 47/32 |
| 2021/0099912 | A1* | 4/2021 | Zhang et al. | H04W 28/10 |
| 2021/0136548 | A1* | 5/2021 | Mladin et al. | H04W 4/70 |

OTHER PUBLICATIONS

Ericsson, "Serving PLMN rate control parameters in modification procedure", 3GPP TSG-SA WG2 Meeting #134, S2-1907063, Sapporo, Japan, Jun. 2019 (2 pages).

Ericsson, "Serving PLMN rate control parameters in modification procedure", 3GPP TSG-SA WG2 Meeting #135, S2-1909802, Split, Croatia, Oct. 2019 (2 pages).

Qualcomm Incorporated et al., "No support for Serving PLMN Rate Control across multiple PDN connections", 3GPP TSG-SA WG2 Meeting #119, S2-171404, Dubrovnik, Croatia, Feb. 2017 (3 pages).

3GPP TS 23.401 V16.0.0 (Sep. 2018), 3rd Generation Partnership Project; Technical Specification Group Services and Systems Aspects; General Packet Radio Service (GPRS) enhancements for Evolved Universal Terrestrial Radio Access Network (E-UTRAN) access (Release 16), Sep. 2018 (410 pages).

3GPP TS 24.301 V15.4.0 (Sep. 2018), 3rd Generation Partnership Project; Technical Specification Group Core Network and Terminals; Non-Access-Stratum (NAS) protocol for Evolved Packet System (EPS); Stage 3 (Release 15), Sep. 2018 (530 pages).

Huawei et al., "Correction of Serving PLMN rate control", SA WG2 Meeting #119, S2-171112, Dubrovnik, Croatia, Feb. 13-17, 2017 (3 pages).

Ericsson, "Serving PLMN rate control", 3GPP TSG-CT WG1 Meeting #98, C1-163139, Osaka (Japan), May 23-27, 2016 (5 pages).

\* cited by examiner

METHODS AND APPARATUSES FOR PLMN RATE CONTROL

CROSS REFERENCE TO RELATED APPLICATIONS

This application is a 35 U.S.C. § 371 National Stage of International Patent Application No. PCT/CN2020/078569, filed Mar. 10, 2020, which claims priority to: 1) International Patent Application No. PCT/CN2019/082512, filed Apr. 12, 2019 and 2) International Patent Application No. PCT/CN2019/077651, filed Mar. 11, 2019. The above identified applications are incorporated by this reference.

TECHNICAL FIELD

Embodiments of the disclosure generally relate to communication, and, more particularly, to methods and apparatuses for public land mobile network (PLMN) rate control.

BACKGROUND

This section introduces aspects that may facilitate better understanding of the present disclosure. Accordingly, the statements of this section are to be read in this light and are not to be understood as admissions about what is in the prior art or what is not in the prior art.

Serving PLMN rate control is intended to protect the control plane (CP) from excessive CP data. As such, the operator may define a rate that is used throughout at the PLMN level. For example, the Serving PLMN rate control value may be defined by a mobility management entity (MME) or session management entity (SMF) and expressed as "x non-access stratum (NAS) data protocol data units (PDUs) per deci hour". There may be a separate limit for uplink and downlink NAS data PDUs.

A user equipment (UE) shall limit the rate at which it generates uplink NAS data PDUs to comply with the serving PLMN policy. Serving PLMN rate control may be provided by the network to the UE in ACTIVATE DEFAULT EPS BEARER CONTEXT REQUEST message or PDU SESSION ESTABLISHMENT RESPONSE. The term EPS refers to evolved packet system. The indicated rate is valid until the packet data network (PDN) connection or the PDU session is released.

A PDN gateway (GW), a service capability exposure function (SCEF), a user plane function (UPF) or a network exposure function (NEF) shall limit the rate at which it generates downlink data PDUs. Serving PLMN rate control may be provided by an MME to the GW/SCEF in CREATE SESSION REQUEST, MODIFY BEARER REQUEST, FORWARD RELOCATION REQUEST, CONTEXT RESPONSE message.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for PLMN rate control.

According to a first aspect of the disclosure, there is provided a method performed by a network function. The method may comprise determining whether a value of PLMN rate control applicable to a terminal device has been changed. The method may further comprise, when determining that the value of PLMN rate control has been changed, sending the changed value of PLMN rate control to the terminal device.

In this way, the network function can be enabled to provide the latest PLMN rate control value to a terminal device.

In an embodiment of the disclosure, whether the value of PLMN rate control has been changed may be determined in response to a request for tracking area update (TAU) from the terminal device.

In an embodiment of the disclosure, the changed value of PLMN rate control may be sent in a reply for accepting TAU.

In an embodiment of the disclosure, the reply for accepting TAU may be a TAU Accept message or a Registration Accept message.

In an embodiment of the disclosure, the changed value of PLMN rate control may be sent in a Downlink non-access stratum (NAS) Transport message.

In an embodiment of the disclosure, the Downlink NAS Transport message may be a request for modifying a connection between the terminal device and a gateway node.

In an embodiment of the disclosure, the request for modifying a connection between the terminal device and a gateway node may be a Modify evolved packet system (EPS) Bearer Context Request message or a protocol data unit (PDU) Session Modification Command message.

In an embodiment of the disclosure, determining that the value of PLMN rate control has been changed may comprise one of: determining that the terminal device has moved from a first PLMN to a second PLMN and values of PLMN rate control are differently configured in the network function for the first and second PLMNs; determining that the terminal device has moved from a first PLMN to a second PLMN and a value of PLMN rate control configured in the network function for the second PLMN is different from that configured in previous network function for the first PLMN; determining that the terminal device remains in a same PLMN and a value of PLMN rate control configured in the network function for the same PLMN has been changed; and determining that the terminal device remains in a same PLMN and a value of PLMN rate control configured in the network function for the same PLMN is different from that configured in previous network function for the same PLMN.

According to a second aspect of the disclosure, there is provided a method performed by a terminal device. The method may comprise receiving, from a network function, a changed value of PLMN rate control applicable to the terminal device. The method may further comprise using the changed value of PLMN rate control for a connection between the terminal device and a gateway node.

In this way, the terminal device can be enabled to use the latest PLMN rate control value.

In an embodiment of the disclosure, the method may further comprise sending a request for TAU to the network function. The changed value of PLMN rate control may be received in response to the sending of the request for TAU.

In an embodiment of the disclosure, the changed value of PLMN rate control may be received in a reply for accepting TAU.

In an embodiment of the disclosure, the reply for accepting TAU may be a TAU Accept message or a Registration Accept message.

In an embodiment of the disclosure, the changed value of PLMN rate control may be received in a Downlink NAS Transport message.

In an embodiment of the disclosure, the Downlink NAS Transport message may be a request for modifying the connection between the terminal device and the gateway node.

In an embodiment of the disclosure, the request for modifying the connection between the terminal device and the gateway node may be a Modify EPS Bearer Context Request message or a PDU Session Modification Command message.

According to a third aspect of the disclosure, there is provided a network node. The network node may comprise at least one processor and at least one memory. The at least one memory may contain instructions executable by the at least one processor, whereby the network node may be operative to determine whether a value of PLMN rate control applicable to a terminal device has been changed. The network node may be further operative to, when determining that the value of PLMN rate control has been changed, send the changed value of PLMN rate control to the terminal device.

In an embodiment of the disclosure, the network node may be operative to perform the method according to the above first aspect.

According to a fourth aspect of the disclosure, there is provided a terminal device. The terminal device may comprise at least one processor and at least one memory. The at least one memory may contain instructions executable by the at least one processor, whereby the terminal device may be operative to receive, from a network function, a changed value of PLMN rate control applicable to the terminal device. The terminal device may be further operative to use the changed value of PLMN rate control for a connection between the terminal device and a gateway node.

In an embodiment of the disclosure, the terminal device may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a network node. The network node may comprise a determination module for determining whether a value of PLMN rate control applicable to a terminal device has been changed. The network node may further comprise a sending module for, when determining that the value of PLMN rate control has been changed, sending the changed value of PLMN rate control to the terminal device.

According to an eighth aspect of the disclosure, there is provided a terminal device. The terminal device may comprise a reception module for receiving, from a network function, a changed value of PLMN rate control applicable to the terminal device. The terminal device may further comprise a control module for using the changed value of PLMN rate control for a connection between the terminal device and a gateway node.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Serving PLMN rate control could be changed due to configuration change or UE location change. MME can include the changed value to GW through MODIFY BEARE REQUEST or CREATE SESSION REQUEST but cannot inform UE about the change because this information element (IE) is only included in ACTIVATE DEFAULT EPS BEARER CONTEXT REQUEST message. That means after the bearer is activated, this IE cannot be changed towards UE until the bearer is deactivated.

For example, UE attaches to MME in PLMN 1 and activates one CP-only PDN connection. The Serving PLMN rate control for PLMN 1 is sent to UE and SGW. Then UE moves to another location in PLMN 2 which has a different serving PLMN rate control value. In tracking area update (TAU) procedure, MME informs SGW about the new value of PLMN 2 in MODIFY BEARER REQUEST or CREATE SESSION REQUEST message. But the new value cannot be sent to UE. This will lead to inconsistency between GW, MME and UE.

Furthermore, Serving PLMN rate control should be PLMN level control for the UE. Although Serving PLMN rate control IE is defined as a PDN level control in ACTIVATE DEFAULT EPS BEARER CONTEXT REQUEST, CREATE SESSION REQUEST, MODIFY BEARER REQUEST messages, it is defined as a UE level control in FORWARD RELOCATION REQUEST, CONTEXT RESPONSE messages. Thus, there exists a kind of misalignment in 3rd generation partnership project (3GPP).

The present disclosure proposes an improved solution for PLMN rate control. The basic idea is to enable a network function (e.g. an MME, an SMF, etc.) to inform a terminal device when there is a change of serving PLMN rate control value. Hereinafter, the solution will be described in detail with reference to FIGS. 1-8.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network function in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future.

In the following, different terms may refer to a same or similar network function or network node with the same or similar functionality in different communication systems. Thus, the specific terms used herein do not limit the present disclosure only to the communication system related to the specific terms, which however can be more generally applied to other communication systems.

Figure 1:
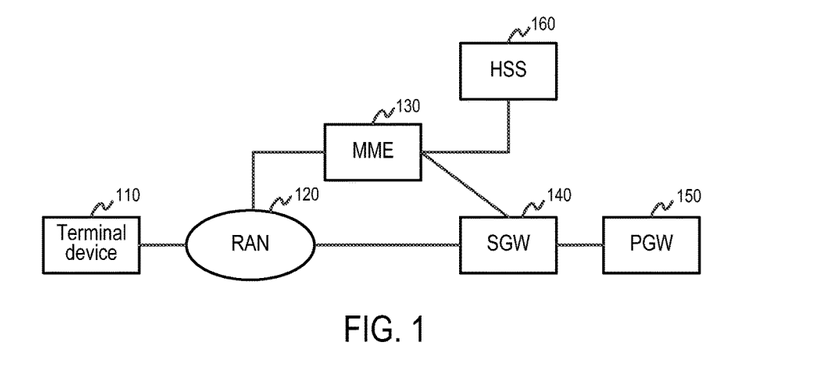
FIG. 1 is a diagram showing an exemplary communication system into which an embodiment of the disclosure is applicable.

FIG. 1 is a diagram showing an exemplary communication system into which an embodiment of the disclosure is applicable. As shown, the communication system comprises a terminal device 110, a radio access network (RAN) 120, a mobility management entity (MME) 130, a serving gateway (SGW) 140, a packet data network (PDN) gateway (PGW) 150 and a home subscriber server (HSS) 160. Note that the number of each entity mentioned above may be more than one.

The terminal device 110 can communicate through a radio access communication link with the RAN 120. The communication may be performed according to any suitable communication protocols. The terminal device may also be referred to as, for example, user equipment (UE), mobile station, mobile unit, subscriber station, access terminal, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 120 may include, for example, a universal mobile telecommunications system (UMTS) terrestrial RAN (UTRAN), a global system for mobile communication (GSM)/enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to terminal devices that are within their respective communication service cells. The E-UTRAN can include radio base station nodes (eNodeBs or eNBs) that can provide the combined functionality of the RNC nodes and base stations of the UTRAN and the GERAN.

The MME 130 is a core network function in evolved packet system (EPS) and can carry out mobility management of the terminal device 110, bearer management, and the like. The SGW 140 can route and forward signalling and user data packets, while also acting as the mobility anchor for user plane during inter-base station/eNodeB handovers and as the anchor for mobility between long term evolution (LTE) and other 3GPP technologies. The PGW 150 can provide entry and exit points to a packet-based network for the traffic of the terminal device 110 flowing through the SGW 140. The packet-based network may include the Internet and/or other packet network elements. The HSS 160 is a control-plane function in the core network of 3GPP public land mobile network (PLMN) and can manage subscriber information of the terminal device 110.

It should be noted that the MME 130, the SGW 140 and the HSS 160 are merely exemplary examples of the components in the communication system and may be replaced by components with similar functionalities. For example, in 5G core (5GC), the MME may be replaced (in some aspects) by a session management function (SMF), and the HSS may be replaced by a unified data management (UDM).

Figure 2:
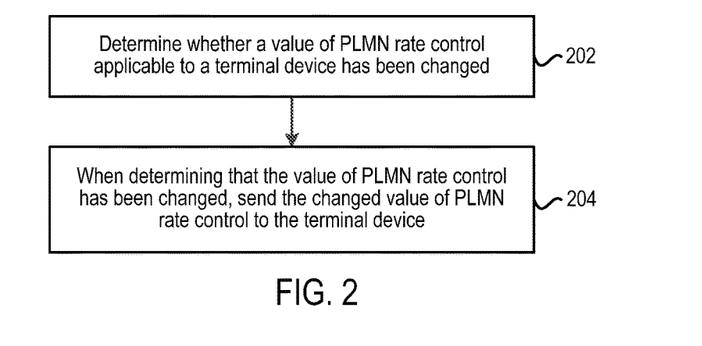
FIG. 2 is a flowchart illustrating a method performed by a network function according to an embodiment of the disclosure.

FIG. 2 is a flowchart illustrating a method performed by a network function according to an embodiment of the disclosure. For example, the network function may be an MME, an SMF, or any other entity having similar functionality. The network function may be implemented either as a network element on a dedicated hardware, as a software instance running on a dedicated hardware, or as a virtualized function instantiated on an appropriate platform, e.g. on a cloud infrastructure. At block 202, the network function determines whether a value of PLMN rate control applicable to a terminal device has been changed. As a first option, the determination at block 202 may be performed in response to a request for tracking area update (TAU) from the terminal device. For this first option, a result that the value of PLMN rate control has been changed may be determined if any one of the following four scenarios is detected. As the first scenario, the terminal device has moved from a first PLMN to a second PLMN and values of PLMN rate control are differently configured in the network function for the first and second PLMNs. In this first scenario, the terminal device is served by the same network function when the terminal device moves from the first PLMN to the second PLMN.

As the second scenario, the terminal device has moved from a first PLMN to a second PLMN and a value of PLMN rate control configured in the network function for the second PLMN is different from that configured in previous network function for the first PLMN. In this second scenario, before and after moving from the first PLMN to the second PLMN, the terminal device is served by the previous network function and the network function respectively. For example, the second scenario may be similar to inter-MME TAU in LTE.

As the third scenario, the terminal device remains in a same PLMN and a value of PLMN rate control configured in the network function for the same PLMN has been changed. For example, such change of the configured PLMN rate control value may be triggered locally or from another network function, e.g. another network function (NF) in 5G. In this third scenario, the terminal device is served by the same network function before and after the trigger event that triggers the request for TAU from the terminal device. Furthermore, although the change of the PLMN rate control value is due to the configuration change of the network function, the request for TAU from the terminal device is used as the trigger event that triggers the determination of block 202.

As the fourth scenario, the terminal device remains in a same PLMN and a value of PLMN rate control configured in the network function for the same PLMN is different from that configured in previous network function for the same PLMN. In this fourth scenario, before and after the trigger event that triggers the request for TAU from the terminal device, the terminal device is served by the previous network function and the network function respectively. For example, the fourth scenario may be similar to inter-MME TAU in LTE. Furthermore, the request for TAU from the terminal device is used as the trigger event that triggers the determination of block 202.

As a second option, there is no need for the determination at block 202 to be performed in response to a request for TAU. For example, the above third scenario may also be applicable to the second option. Once the configuration change of the network function is detected, it may be determined that the value of PLMN rate control has been changed.

At block 204, when determining that the value of PLMN rate control has been changed, the network function sends the changed value of PLMN rate control to the terminal device. In this way, the network function can be enabled to provide the latest PLMN rate control value to a terminal device. In the above first option, the changed value of PLMN rate control may be sent in a reply for accepting TAU. As an exemplary example, the reply for accepting TAU may be a TAU Accept message in LTE or a Registration Accept message in 5G. Alternatively, the changed value of PLMN rate control may be sent in a Downlink NAS Transport message. For instance, the Downlink NAS Transport message may be a request for modifying a connection between the terminal device and a gateway node. The gateway node may be an SGW, a user plane function (UPF), or any other entity having similar functionality. The connection may be a PDN connection in LTE or a PDU session in 5G. As an exemplary example, the request for modifying a connection between the terminal device and a gateway node may be a Modify EPS Bearer Context Request message in LTE or a PDU Session Modification Command message in 5G.

In the above second option, the changed value of PLMN rate control may be sent in a Downlink NAS Transport message. For example, once the configuration change of the network function is detected as described above, the changed value of PLMN rate control may be sent to every terminal device served by the network function.

Figure 3:
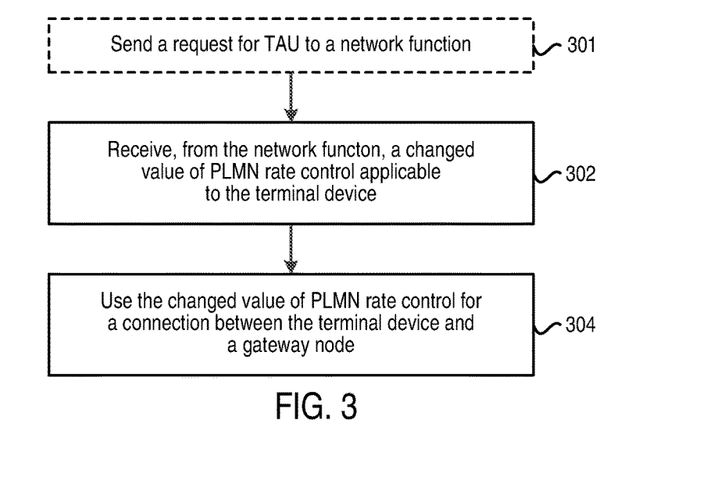
FIG. 3 is a flowchart illustrating a method performed by a terminal device according to an embodiment of the disclosure.

FIG. 3 is a flowchart illustrating a method implemented at a terminal device according to an embodiment of the disclosure. At block 302, the terminal device receives, from a network function, a changed value of PLMN rate control applicable to the terminal device. For example, as described above with respect to the second option for block 202, the terminal device may remain in a same PLMN and a value of PLMN rate control configured in the network function for the same PLMN may have been changed. This may lead to the reception at block 302. For example, the changed value of PLMN rate control may be received in a Downlink NAS Transport message.

Optionally, at block 301, the terminal device sends a request for TAU to the network function. The changed value of PLMN rate control may be received at block 302 in response to the sending of the request for TAU. For example, as described above with respect to the first option for block 202, there may be four scenarios. As the first scenario, the terminal device has moved from a first PLMN to a second PLMN and values of PLMN rate control are differently configured in the network function for the first and second PLMNs. As the second scenario, the terminal device has moved from a first PLMN to a second PLMN and a value of PLMN rate control configured in the network function for the second PLMN is different from that configured in previous network function for the first PLMN. As the third scenario, the terminal device remains in a same PLMN and a value of PLMN rate control configured in the network function for the same PLMN has been changed. As the fourth scenario, the terminal device remains in a same PLMN and a value of PLMN rate control configured in the network function for the same PLMN is different from that configured in previous network function for the same PLMN. For example, in any one of the above four scenarios, the changed value of PLMN rate control may be received in a reply for accepting TAU or in a Downlink NAS Transport message.

At block 304, the terminal device uses the changed value of PLMN rate control for a connection between the terminal device and a gateway node. The connection and the gateway node have been explained above. In this way, the changed value may be used for the subsequent PLMN rate control on the connection. In the above first option, the changed value may be used at the terminal device level. In the above second option, the changed value may be used at the connection level.

Figure 4:
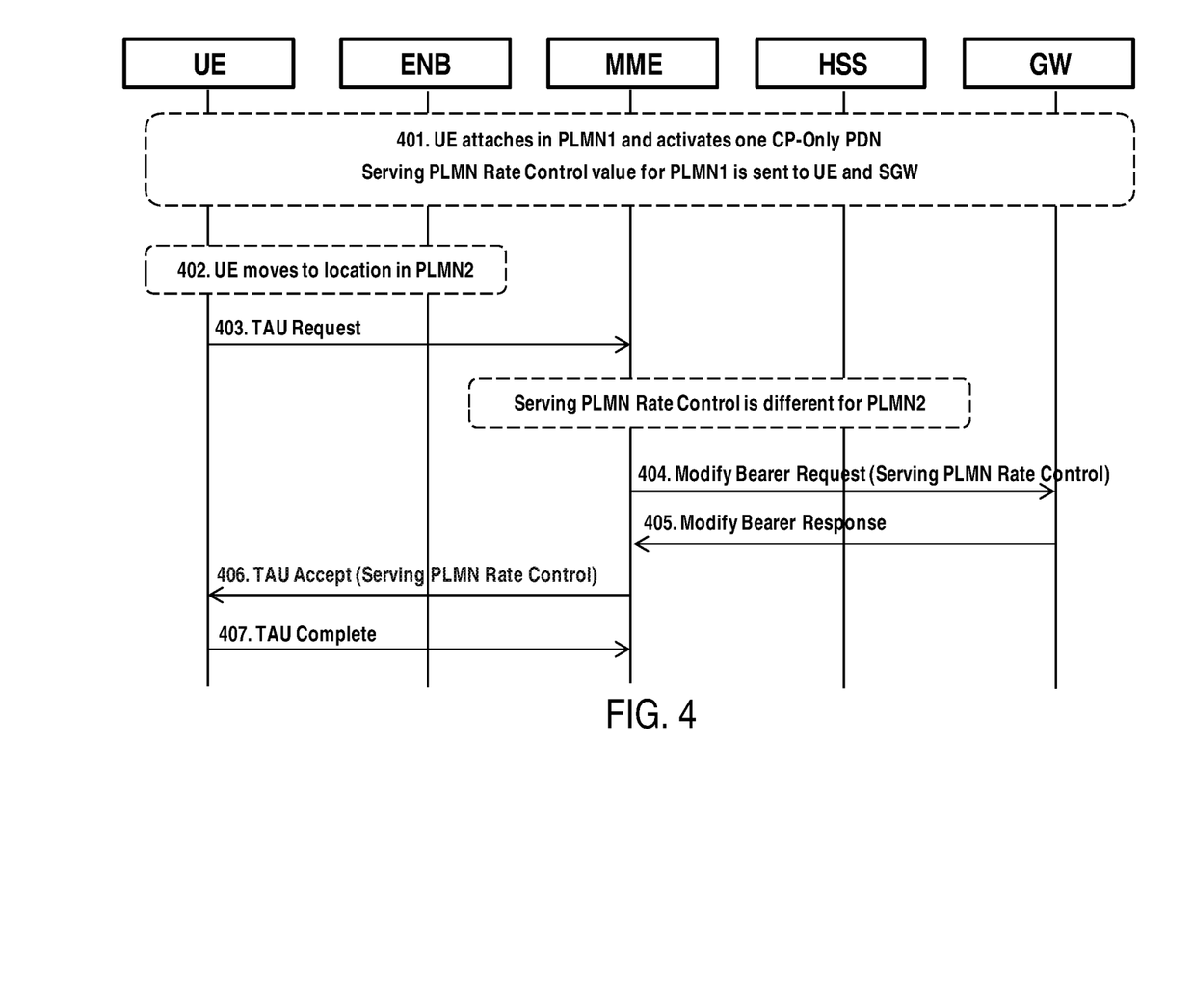
FIG. 4 is a flowchart illustrating an exemplary process according to an embodiment of the disclosure.

FIG. 4 is a flowchart illustrating an exemplary process according to an embodiment of the disclosure. As shown, the exemplary process involves five entities, i.e. a UE, an eNB, an MME, an HSS and a GW (e.g. SGW). This process enables the MME to inform the UE with the change of serving PLMN rate control in UE level. At block 401, the UE attaches to the MME in PLMN 1 and establishes a PDN connection which uses S11-U. The S11-U is an interface used for small data transmissions between the MME and the SGW. Since the serving PLMN rate control is applicable to control plane (CP), the PDN connection is set to CP only. The MME informs the UE and the GW of ServingPlmn-RateControl for PLMN 1. At block 402, the UE moves to a new location in PLMN 2. Suppose the UE is served by the same MME during this process and ServingPlmnRateControl for PLMN 2 is different from PLMN 1 in the MME's local configuration.

At block 403, the UE sends a TAU Request to the MME. Since the serving PLMN rate control is applicable to CP, the TAU Request has a signaling active flag. At block 404, the MME detects that ServingPlmnRateControl for PLMN 2 is different from PLMN 1, and thus sends a Modify Bearer Request to the SGW with new ServingPlmnRateControl. At block 405, the SGW replies with a Modify Bearer Response. At block 406, the MME sends a TAU Accept to the UE with the new ServingPlmnRateControl. With this newly added information element (IE) (ServingPlmnRateControl in TAU Accept), the MME can inform the UE of the latest value of ServingPlmnRateControl such that the UE can limit uplink NAS data PDUs according to the network policy timely. It can also keep the consistency between the UE, the MME and the GW. The UE may save this new value. At block 407, the UE replies with a TAU Complete. Since the new value is provided via TAU Accept, the UE needs to apply it for each bearer (at the UE level).

Figure 5:
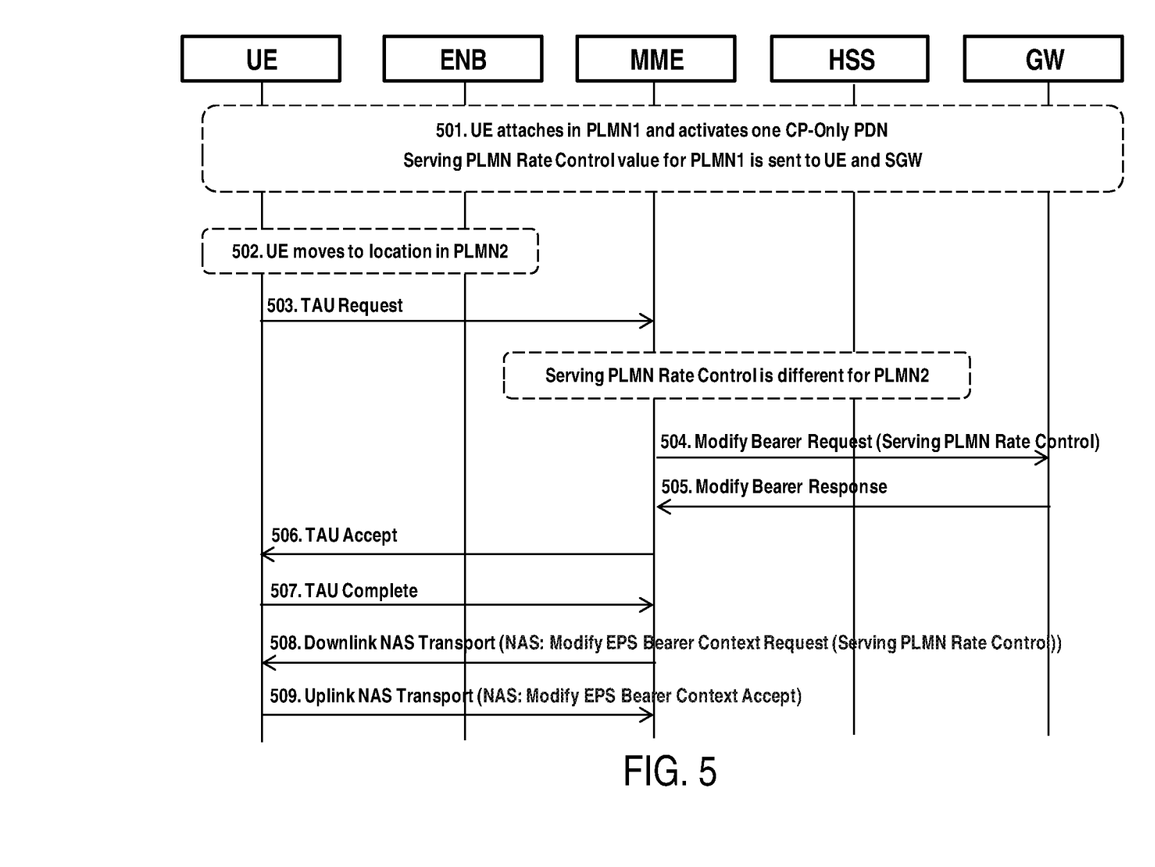
FIG. 5 is a flowchart illustrating an exemplary process according to another embodiment of the disclosure.

FIG. 5 is a flowchart illustrating an exemplary process according to an embodiment of the disclosure. Similar to FIG. 4, this process also involves five entities, i.e. a UE, an eNB, an MME, an HSS and a GW (e.g. SGW). The process enables the MME to inform the UE with the change of serving PLMN rate control in PDN level. Blocks 501-505 in this process are the same as blocks 401-405 of FIG. 4 and their details are omitted here. At block 506, the MME sends a TAU Accept to the UE. At block 507, the UE replies with a TAU Complete. At block 508, the MME sends a Modify EPS Bearer Context Request with new ServingPlmnRate-Control to the UE, which is included in a Downlink NAS Transport message. The NAS procedure Modify EPS Bearer Context Request/Accept is legacy message in 3GPP. The ServingPlmnRateControl is a newly added IE in Modify EPS Bearer Context Request. At block 509, the UE replies with a Modify EPS Bearer Context Accept. The UE may update the ServingPlmnRateControl locally. With the newly added blocks 508-509, the UE can be informed of the changed ServingPlmnRateControl value such that the UE can limit uplink NAS data PDUs according to the network policy timely. It can also keep the consistency between the UE, the MME and the GW. It should be noted that two blocks shown in succession in the figures may, in fact, be executed substantially concurrently, or the blocks may sometimes be executed in the reverse order, depending upon the functionality involved.

Figure 6:
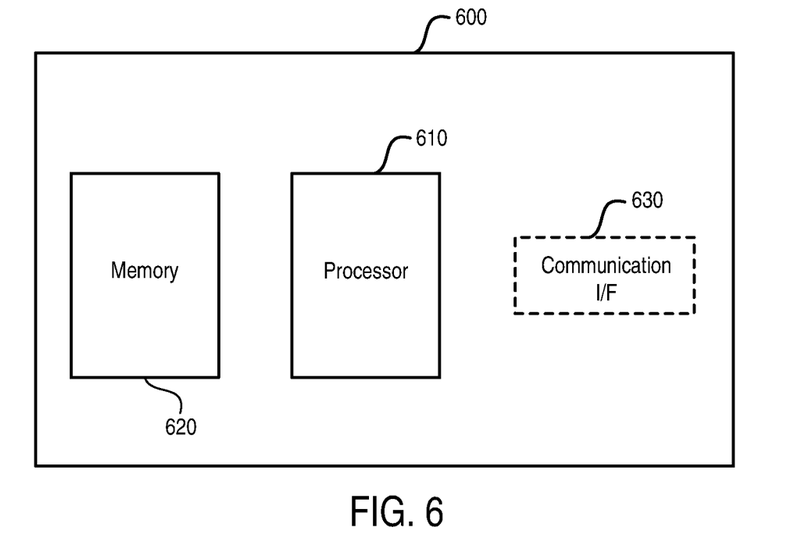
FIG. 6 is a block diagram showing an apparatus suitable for use in practicing some embodiments of the disclosure.

FIG. 6 is a block diagram showing an apparatus suitable for use in practicing some embodiments of the disclosure. For example, any one of the network function and the terminal device described above may be implemented through the apparatus 600. As shown, the apparatus 600 may include a processor 610, a memory 620 that stores a program, and optionally a communication interface 630 for communicating data with other external devices through wired and/or wireless communication.

The program includes program instructions that, when executed by the processor 610, enable the apparatus 600 to operate in accordance with the embodiments of the present disclosure, as discussed above. That is, the embodiments of the present disclosure may be implemented at least in part by computer software executable by the processor 610, or by hardware, or by a combination of software and hardware.

The memory 620 may be of any type suitable to the local technical environment and may be implemented using any suitable data storage technology, such as semiconductor based memory devices, flash memories, magnetic memory devices and systems, optical memory devices and systems, fixed memories and removable memories. The processor 610 may be of any type suitable to the local technical environment, and may include one or more of general purpose computers, special purpose computers, microprocessors, digital signal processors (DSPs) and processors based on multi-core processor architectures, as non-limiting examples.

Figure 7:
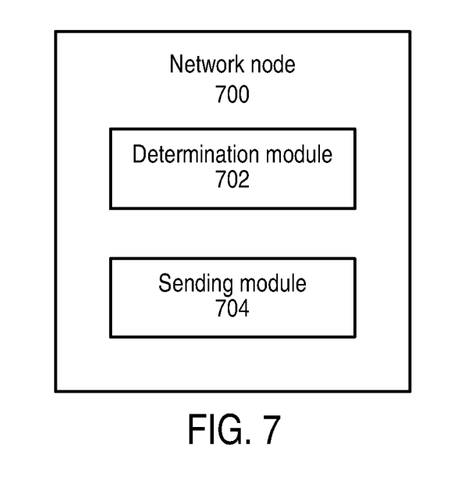
FIG. 7 is a block diagram showing a network node according to an embodiment of the disclosure.

FIG. 7 is a block diagram showing a network node according to an embodiment of the disclosure. As shown, the network node 700 comprises a determination module 702 and a sending module 704. The determination module 702 may be configured to determine whether a value of PLMN rate control applicable to a terminal device has been changed, as described above with respect to block 202. The sending module 704 may be configured to, when determining that the value of PLMN rate control has been changed, send the changed value of PLMN rate control to the terminal device, as described above with respect to block 204.

Figure 8:
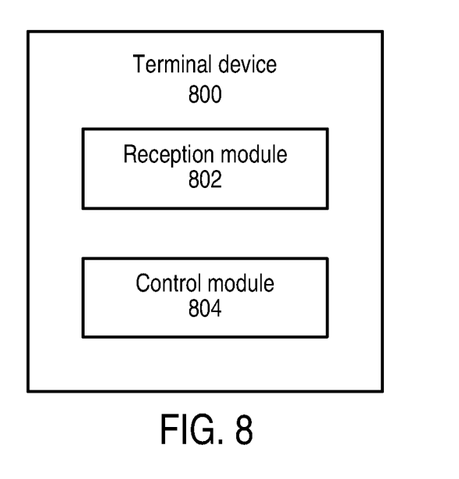
FIG. 8 is a block diagram showing a terminal device according to an embodiment of the disclosure.

FIG. 8 is a block diagram showing a terminal device according to an embodiment of the disclosure. As shown, the terminal device 800 comprises a reception module 802 and a control module 804. The reception module 802 may be configured to receive, from a network function, a changed value of PLMN rate control applicable to the terminal device, as described above with respect to block 302. The control module 804 may be configured to use the changed value of PLMN rate control for a connection between the terminal device and a gateway node, as described above with respect to block 304. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a network function comprising:
   determining whether a value of public land mobile network (PLMN) rate control applicable to a terminal device has been changed; and
   after determining that the value of PLMN rate control has been changed, sending the changed value of PLMN rate control to the terminal device, wherein
   determining that the value of PLMN rate control has been changed comprises:
   (i) determining that the terminal device has moved from a first PLMN to a second PLMN, and
   (ii) determining (a) values of PLMN rate control are differently configured in the network function for the first and second PLMNs or (b) a value of PLMN rate control configured in the network function for the second PLMN is different from that configured in previous network function for the first PLMN.

2. The method of claim 1, wherein whether the value of PLMN rate control has been changed is determined in response to a request for tracking area update (TAU) from the terminal device.

3. The method of claim 2, wherein the changed value of PLMN rate control is sent in a reply for accepting TAU.

4. The method of claim 1, wherein
   the changed value of PLMN rate control is sent in a Downlink non-access stratum (NAS) Transport message,
   the Downlink NAS Transport message is a request for modifying a connection between the terminal device and a gateway node, and
   the request for modifying a connection between the terminal device and a gateway node is a Modify evolved packet system Bearer Context Request message or a protocol data unit Session Modification Command message.

5. A method performed by a terminal device, the method comprising:
   receiving, from a network function, a Protocol Data Unit (PDU) Session Modification Command message comprising a changed value of public land mobile network (PLMN) rate control applicable to the terminal device; and
   using the changed value of PLMN rate control for a connection between the terminal device and a gateway node.

6. The method of claim 5, further comprising: sending a request for tracking area update (TAU) to the network function, wherein
   the changed value of PLMN rate control is received in response to the sending of the request for TAU.

7. The method of claim 5, wherein the network function is a session management entity or a mobility management entity.

8. A network node comprising:
   at least one processor; and
   at least one memory, the at least one memory containing instructions executable by the at least one processor, wherein the network node is operative to:
   determine whether a value of public land mobile network (PLMN) rate control applicable to a terminal device has been changed; and
   after determining that the value of PLMN rate control has been changed, send the changed value of PLMN rate control to the terminal device, wherein
   the network node is configured to determine that the value of PLMN rate control has been changed by performing a process that comprises:
   (i) determining that the terminal device has moved from a first PLMN to a second PLMN, and
   (ii) determining (a) values of PLMN rate control are differently configured in the network function for the first and second PLMNs or (b) a value of PLMN rate control configured in the network function for the second PLMN is different from that configured in previous network function for the first PLMN.

9. A terminal device comprising:
   at least one processor; and
   at least one memory, the at least one memory containing instructions executable by the at least one processor, whereby the terminal device is operative to:
   receive, from a network function, a Protocol Data Unit (PDU) Session Modification Command message comprising a changed value of public land mobile network (PLMN) rate control applicable to the terminal device; and
   use the changed value of PLMN rate control for a connection between the terminal device and a gateway node.

* * * * *

UNITED STATES PATENT AND TRADEMARK OFFICE
CERTIFICATE OF CORRECTION

PATENT NO. : 11,451,996 B2
APPLICATION NO. : 17/437299
DATED : September 20, 2022
INVENTOR(S) : Yang et al.

It is certified that error appears in the above-identified patent and that said Letters Patent is hereby corrected as shown below:

In the Drawings

In Fig. 3, Sheet 1 of 4, for Tag "302", in Line 1, delete "functon," and insert -- function, --, therefor.

In the Specification

In Column 1, Line 34, delete "session management entity (SMF)" and insert -- session management function (SMF) --, therefor.

In Column 5, Line 61, delete "GSM evolution" and insert -- GSM --, therefor.

In Column 11, Line 36, delete "non-Limiting" and insert -- non-limiting --, therefor.

In the Claims

In Column 11, Line 44, in Claim 1, delete "the changed value" and insert -- a changed value --, therefor.

In Column 12, Line 38, in Claim 8, delete "the changed value" and insert -- a changed value --, therefor.

In Column 12, Line 46, in Claim 8, delete "the network function" and insert -- a network function --, therefor.

Signed and Sealed this
Seventh Day of March, 2023

Katherine Kelly Vidal
*Director of the United States Patent and Trademark Office*